United States Patent [19]

Vacquer

[11] Patent Number: 5,241,757
[45] Date of Patent: Sep. 7, 1993

[54] METHOD AND APPARATUS FOR THE DEPLOYMENT OF A DUCT WITHIN A MASS OF POWDER-LIKE MATERIAL

[75] Inventor: Benoît Vacquer, Rouen, France

[73] Assignee: Desinsectisation Moderne, Rouen, France

[21] Appl. No.: 755,296

[22] Filed: Sep. 5, 1991

[30] Foreign Application Priority Data

Sep. 6, 1990 [FR] France .................. 90 11081

[51] Int. Cl.⁵ .............................................. F26B 3/08
[52] U.S. Cl. ........................................ 34/10; 34/57 R
[58] Field of Search ................. 34/57 R, 57 A, 57 B, 34/10, 218; 141/89, 91, 337, 353, 354, 355, 388; 138/89; 266/220, 225

[56] References Cited

U.S. PATENT DOCUMENTS 4,854,349 8/1989 Foreman .................. 138/89

FOREIGN PATENT DOCUMENTS 506705 7/1979 Australia .
1924993 11/1969 Fed. Rep. of Germany .
3528024 2/1987 Fed. Rep. of Germany .
2487638 2/1982 France .
2545690 11/1984 France .

Primary Examiner—Henry A. Bennet
Attorney, Agent, or Firm—Schweitzer Cornman & Gross

[57] ABSTRACT

The subject matter of the present invention is a method for the deployment of a duct within a mass of powder-like material, according to which the duct is deployed from a compact configuration, characterized by the fact that the duct is brought in this compact configuration to a point in the mass of powder-like material and, while one end of the duct is held fixed, the other end is moved toward the exterior of the mass of powder-like material, the deployment of the duct thus being effected.

5 Claims, 5 Drawing Sheets

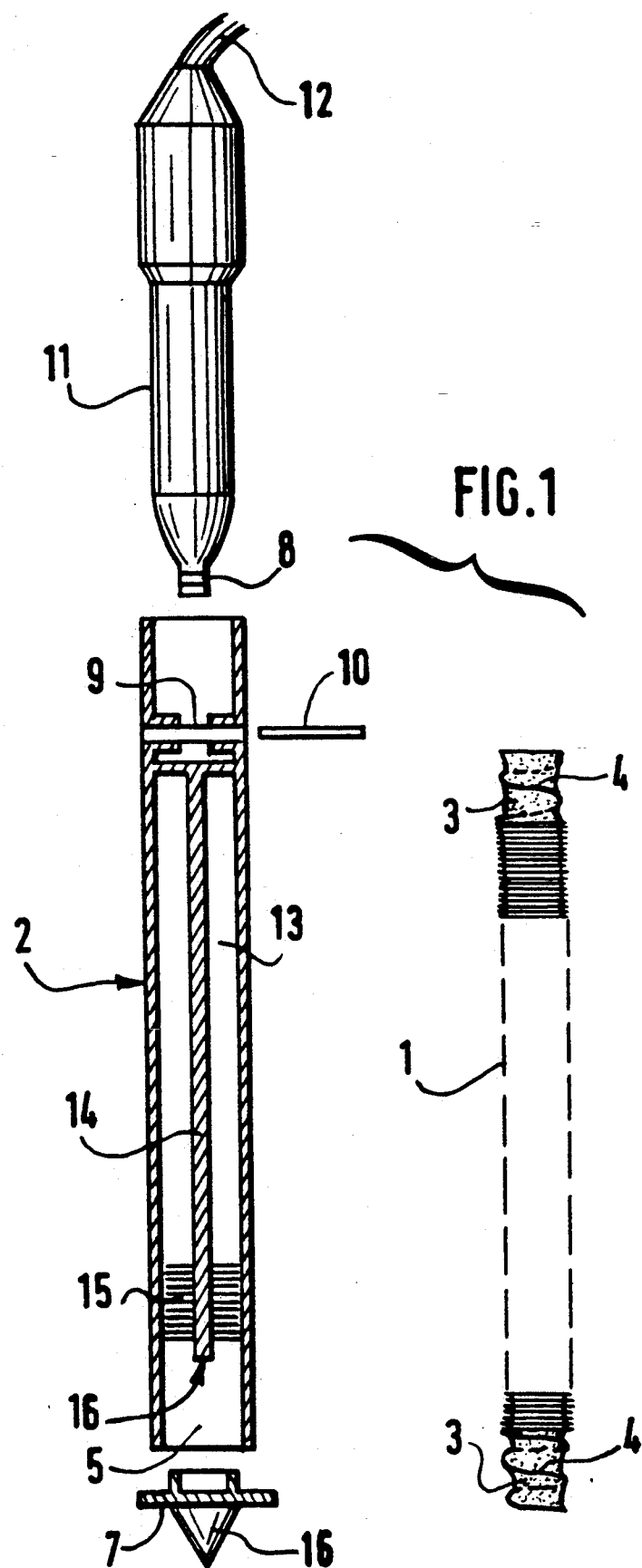

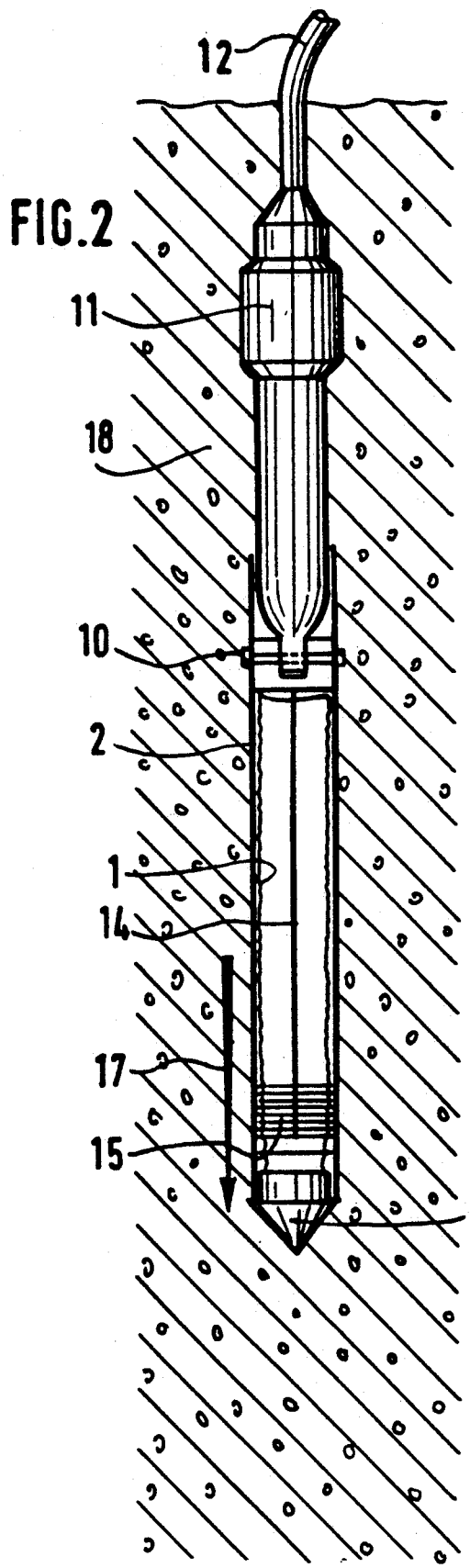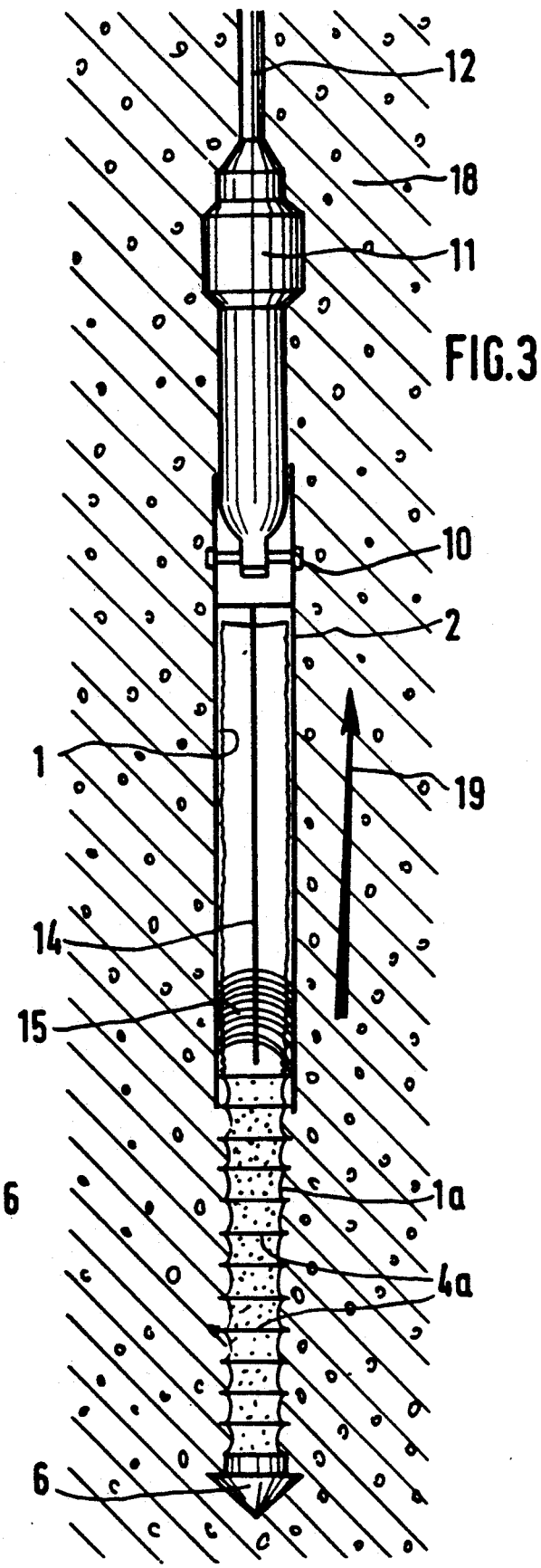

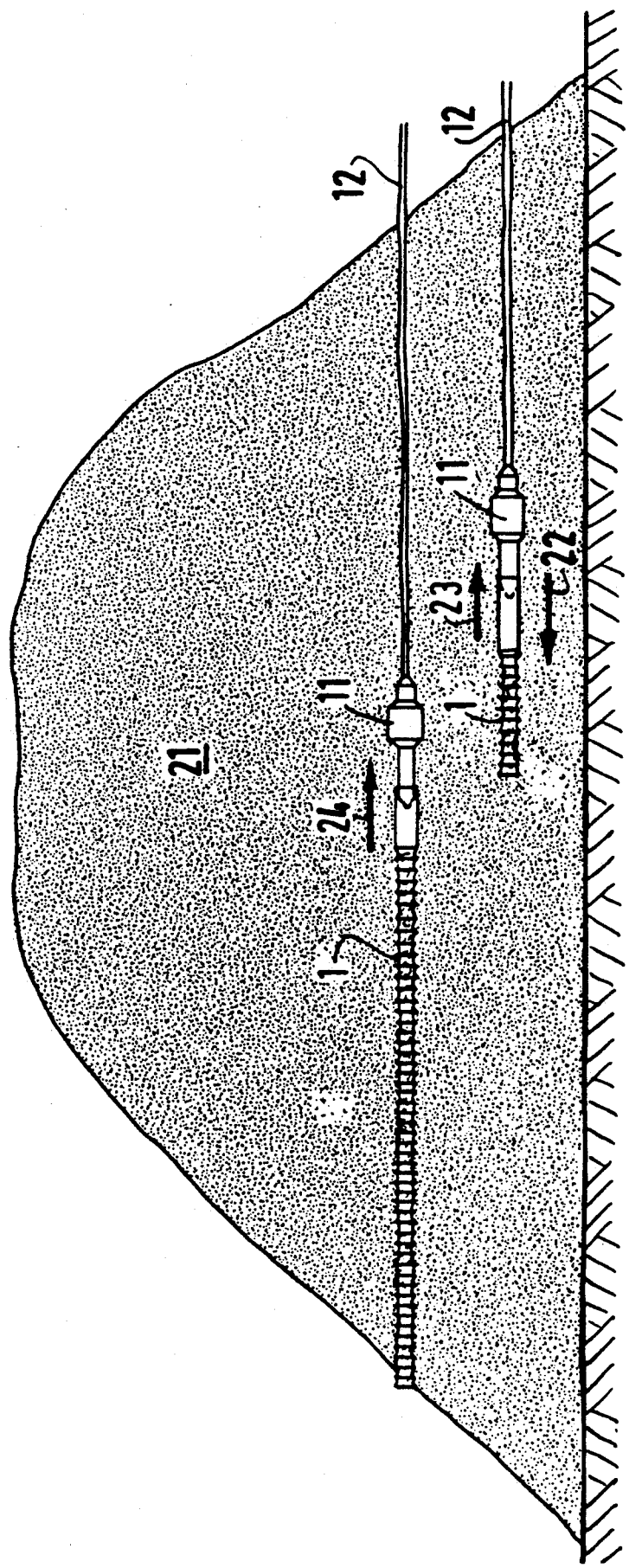

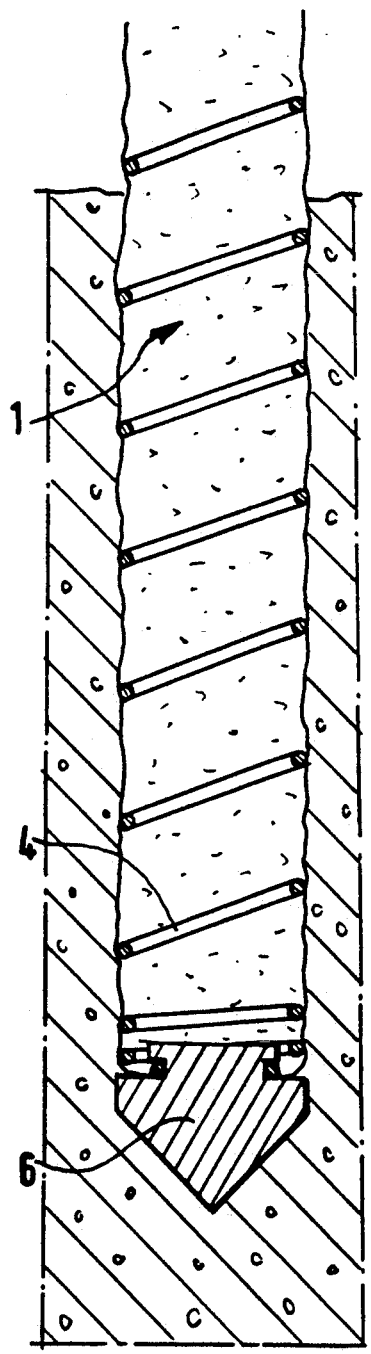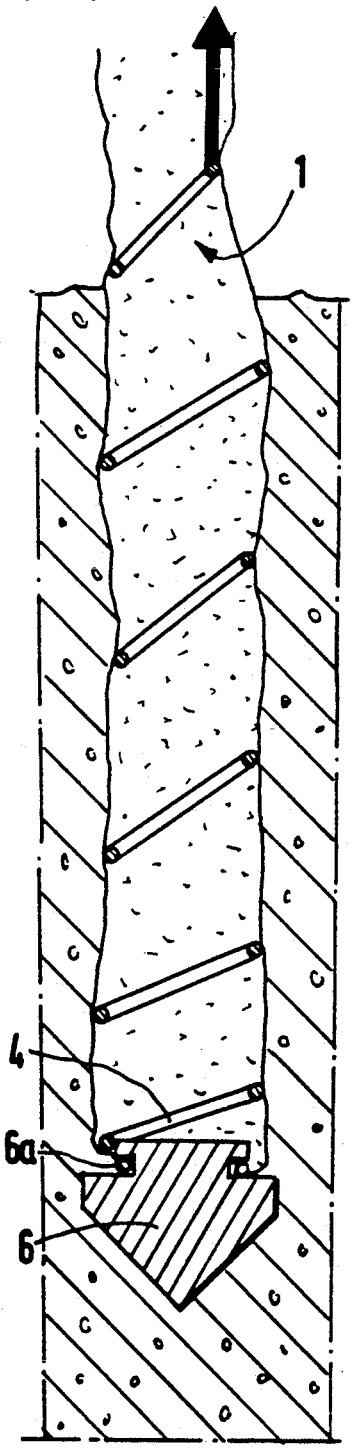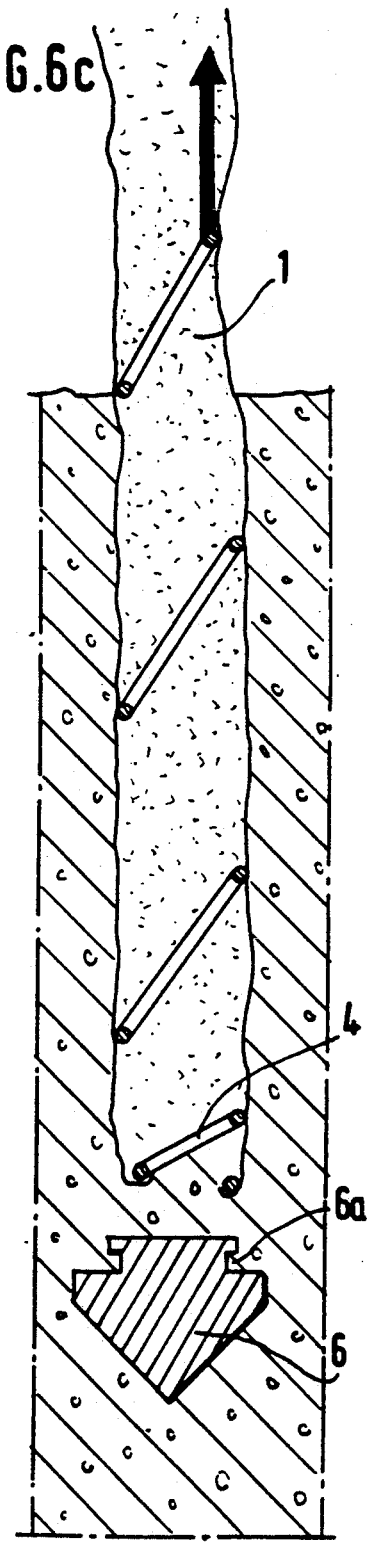

METHOD AND APPARATUS FOR THE DEPLOYMENT OF A DUCT WITHIN A MASS OF POWDER-LIKE MATERIAL

BACKGROUND OF THE INVENTION

The invention relates to a method and to an apparatus for the deployment of a duct within a mass of powder-like material, such as cereal grains.

The present invention in particular permits the creation of an access to the interior of a mass of powder-like material situated, for example, in a geological formation, a ship's hold, a silo, or any other storage unit.

By creating such access it is possible to carry out observations, take samples, or perform a desired treatment.

This is particularly important in the case of grains, so as to be able to inspect them and/or to protect them effectively and lastingly, particularly against parasites.

SUMMARY OF THE PRESENT INVENTION

The subject matter of the present invention is a method for the deployment of a duct within a mass of powder-like material, according to which the duct is deployed from a compact configuration, characterized by the fact that the duct is brought in this compact configuration to a point in the mass of powder-like material and, while one end of the duct is held fixed, the other end is moved toward the exterior of the mass of powder-like material, the deployment of the duct thus being effected.

In a preferred embodiment, the duct is placed in its compact configuration into a container and is provided with a penetrating/anchoring detachable extremity which is temporarily affixed to one end of the duct remains in fixed position in the mass of powder-like material when the container is moved toward the exterior of the powder-like mass to deploy the duct.

According to a preferred embodiment of the invention, the container is moved within the powder-like mass by means of a probe operating by percussion or vibration in one or the other direction.

In one of its preferred applications, the present invention relates to a method of treatment of cereal grains, characterized by the fact that at least one permeable duct is deployed through a mass of cereal grains by the method that has been described above, that a cereal treatment product, such as dry or hot air, is injected to aerate or dry the cereal grains, or that fumigants or gases are injected to combat parasites, and/or that the duct is ventilated or a partial vacuum is produced inside the duct for the purpose of, for example, removing a gas that is in the mass of grain.

The present invention is also directed to an apparatus for the practice of the method that has just been described, this apparatus having a duct adapted to be put into a first, compact configuration and into a second, deployed configuration, characterized by the fact that it comprises a container open at one of its extremities to receive the duct in its compact configuration, a piece preferably shaped to facilitate penetration of the container into the powder-like mass, affixed to one end of the duct and detachably fitted to the open end of the container so as to remain in the powder-like mass when it is deployed.

In a preferred embodiment, the container comprises a retaining means to keep the duct in its compact configuration within the container, when it is deployed.

This means can comprise, for example, a brush that is provided with a series of radially disposed semi-rigid bristles, the ends which thrust against the interior of the duct in its compact configuration, or also a deformable foam, which holds the duct in its compact configuration by exerting a certain pressure against the inside surface of the duct.

The duct is advantageously deployed all the way to the surface of the powder-like material. It thus permits inspections, measurements or sampling to learn the composition or the state of the mass of powder-like material.

The sheath thus permits the powder-like material to be treated by injecting, for example, a chemical product intended to eliminate parasites situated within the mass of grains, or also to be ventilated or to have air or a gas, which was previously injected, extracted.

In its compact configuration, the duct can be folded, pleated, compressed, corrugated, convoluted or in bellows form, on the condition only that it can be deployed by applying axial traction to one of its extremities.

In a first variant of embodiment, the wall of the duct is made of a porous material, such as cloth, so that the duct can be easily traversed by a gas or a liquid.

In a second variant, the wall of the duct has openings for this purpose, which are regularly spaced, for example, on the surface of the duct and the size of which preferably is sufficiently small, so as to prevent significant penetration of the powder-like material into the interior of the duct.

In this case the duct can be made, for example, with the help of a thin aluminum foil, which is girdled to give it the shape of accordion pleats of circular section, so that the duct can be stored in the container in its compact configuration and be deployed later on in accordance with the invention.

Pursuant to the invention, the duct can be given a deformable wall, which preferably is permeable and is supported by an armature comprising, for example, a helical metal or plastic wire, which is located preferably inside the duct.

In this case, after the duct has been used, it can be removed from the powder-like material by exerting traction on the armature.

The device of the present invention is particularly adapted for creating vertical tunnels in a powder-like material.

The invention will be better understood from the description that follows and in connection with the appended drawing, which are given by way of illustration and not by way of limitation.

DESCRIPTION OF THE DRAWINGS

FIG. 1 is a diagrammatic view of an embodiment of the inventive apparatus;

FIG. 2 is a diagrammatic view illustrating a vertical penetration of the apparatus of FIG. 1 into a powder-like mass;

FIG. 3 is a diagrammatic view illustrating the removal of the container of FIG. 2 for the deployment of the duct;

FIG. 5 is a diagrammatic view showing the placement of horizontal ducts, and FIGS. 6a, 6b and 6c are diagrammatic views showing the removal of the duct by traction on the spiral armature.

DETAILED DESCRIPTION OF THE INVENTION

Figure 4:
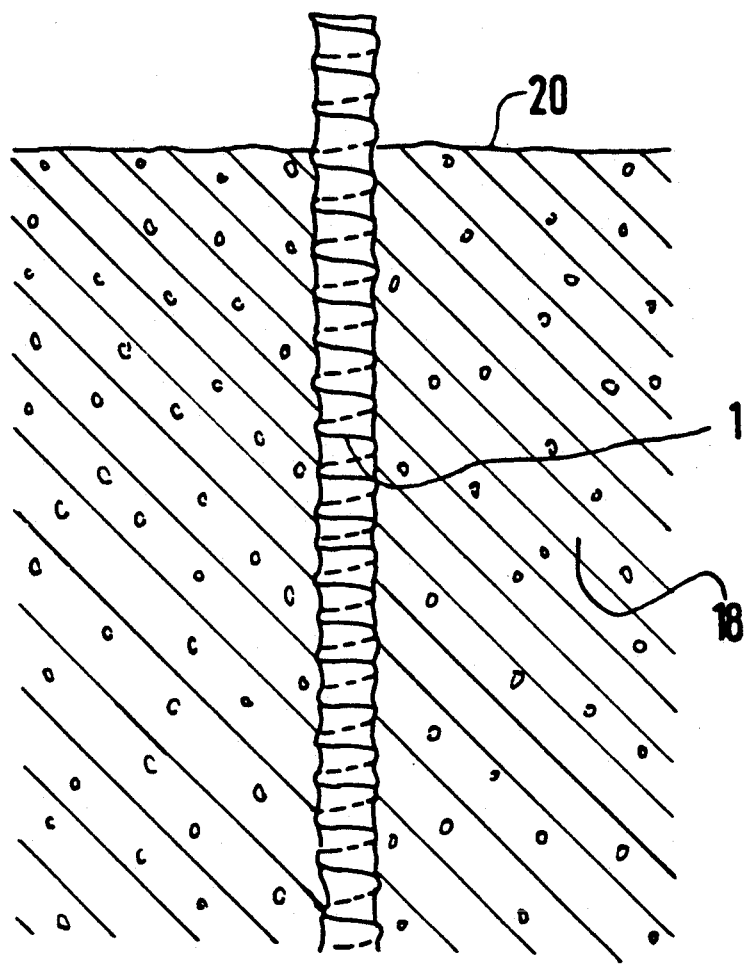
FIG. 4 is a diagrammatic view showing the duct placed in the powder-like mass.

FIG. 1 shows an embodiment of the apparatus of the present invention.

This apparatus comprises a duct 1, which can assume a compact configuration and a deployed configuration. In the compact configuration, represented in FIG. 1, the duct, which has a ringed structure, is compressed axially on itself so as to reduce its length considerably so that it can enter the container 2.

In the preferred variant, represented in FIG. 1, the duct has an armature comprising, for example, a spiral, plastic or metal wire, which sustains the wall 3 of the duct when placed inside of the latter.

To simplify the drawing, this spiral armature is represented in FIG. 1 by parallel lines, which are perpendicular to the axis of the duct except at the ends of the duct, where the wall 3 of the duct as well as the spiral armature 4 can be seen.

The wall 3 of the duct comprises, for example, a woven material or a film of porous plastic material.

An axial compression of the armature 4 permits the compact configuration of the duct 1 to be obtained.

When the duct changes from its compact configuration to its deployed configuration, the pitch of the spiral armature greatly increases, while its diameter decreases and the wall 3 of the duct is deployed to assume a substantially cylindrical shape.

In a variant of the invention, the internal spiral armature is independent or is lightly attached to the wall of the duct so that after deployment of the duct, the armature can be withdrawn simply by traction on its end situated outside of the powder-like mass. In the absence of the armature, the duct flattens and can easily be withdrawn by simple traction.

In another variant, a pull on an armature, which remains affixed to the wall, produces a reduction in the diameter of the latter and thus permits the duct to be withdrawn from the powder-like material after use.

The inside diameter of the duct is generally less than 100 mm. It is, for example, between 25 and 70 mm, and preferably between 50 and 60 mm.

The length of the duct depends on the volume of the mass of powder-like material, in which the duct is to be placed. This length can run to more than 100 meters. It can range, for example, from 10 to 60 meters.

In a variant, the duct has openings on its surface, which can be distributed in any manner. These openings can be obtained simply by perforating the wall of the particular duct, when the latter is made of a thin sheet of aluminum.

According to a preferred embodiment of the invention, the duct is stored in a cartridge-like container 2, which, in the example shown in FIG. 1, is of a substantially cylindrical shape with an open end 5, which can be plugged with a penetrating/anchoring closure end piece 6 of advantageously conical shape to facilitate penetration of the container into the mass of powder-like material.

In the employment of the apparatus, piece 6 is attached to one end of the duct 1 and then is lightly attached to and readily removably associated with the body of the container 2. An anchoring collar 7 is associated with the conical piece 6 as shown in FIG. 1.

While the container 2 is penetrating into the powder-like material, piece 6 is held against the opening 5 of the container by the pressure exerted by the powder-like material.

However, during the deployment of the duct 1, piece 6, which is retained or anchored by its collar 7 in the powder-like mass, detaches itself from the container 2 and remains anchored in the mass.

Conical piece 6 with its collar or anchor plate 7 thus permits one end of the duct 1 to be maintained in the mass of powder-like material.

In the example illustrated in FIG. 1, the container 2 is driven by a vibratory or percussion probe 11 which engages at its front end 8 an opening 9 of the container and is held there by a pin 10, for example.

Such a probe, powered by an electric cable or compressed-air tube 12, is described in French patent application 90.02685 filed on Mar. 5, 1990. It comprises an enclosure containing a striking piston, which acts in one direction on a front anvil zone or in the other direction on a rear anvil zone. The impacts of the striking piston on the front anvil zone cause the probe to advance, and vice versa.

Such vibratory or percussion probes can be driven electrically or pneumatically. They make it possible to propel the container 2 containing the duct 1 in its compact configuration forward into the interior of the mass of powder-like material or backward for the purpose of deploying the duct.

Experiments made by the applicant company have shown that, surprisingly, the presence of the container 2 containing the duct 1 ahead of the probe 11 facilitates the penetration of this assembly into the mass of powder-like material. Thus it is that the probe 11 coupled to the container 2 buries itself more rapidly in the powder-like material than if it were alone.

As it can be seen in FIG. 1, the central body of the container holds axially in its cavity 13 a rod 14 equipped radially with semi-rigid nylon bristles 15, which reach to the vicinity of the inside wall of the cavity 13, forming a brush 16, the head of which is close to the opening 5 of the container.

Due to the flexibility of its bristles 15, the duct 1 can be introduced in compact configuration into the container 2, wherein it is held by the semi-rigid bristles 15 of the brush 16.

FIG. 2 represents the inventive apparatus during its substantially vertical descent into a mass of powder-like material 18.

Under the action of the probe 11, the descent of the container into the powder-like material 18 is made in the direction of the arrow 17 to the desired depth, for example, to near the bottom of a silo or a ship's hold.

By means of an appropriate remote control signal, the probe 11 and container 2 are made to re-ascend in the direction of arrow 19 of FIG. 3, while the brush 16 retains the duct 1 within the container and provides for its regular deployment as the container re-ascends.

The deployed portion of the duct 1, whose bottom end is held in place by anchoring collar piece 7, can be seen at 1a in FIG. 3.

Portion 1a of the duct has been represented in FIG. 4 by an armature composed of a succession of rings 4a. However, it is clear that it is generally easier to make an armature of a spiral shape as described above.

In a variant, the brush 16 can be replaced by a piece of resilient foam, onto which the duct is forced in its compact configuration. The action of the resilient foam prevents the premature deployment of the sheath while the container is being retrieved.

FIG. 4 shows a duct 1 deployed within the mass 18 of powder-like material up to the surface of the latter.

The duct thus constitutes a well, which provides access to the interior of the powder-like mass.

The duct 1 advantageously is permeable or has opening permitting gases or liquids into the powder-like mass, for example for the treatment of the latter. It is also possible to lower data acquisition means through the duct in order to assure, for example, that the grain, which is stored in the hold of a ship, is of good quality and in a good state of preservation.

The duct also permits samples of powder-like material to be taken at different depths.

Furthermore, it permits treatments of the powder-like material, such as aeration or drying, to be carried out and materials, designed to combat parasites, to be injected.

FIG. 5 shows a horizontal employment of the apparatus of the present invention, for example to place a duct through a pile 21 of powder-like material.

In the lower part of FIG. 5, there is an inventive apparatus, which, after having penetrated in the direction of arrow 22 to the middle of the pile, returns in the direction of arrow 23 while deploying the duct 1 from the center to the right side of the pile 21.

It can also be seen in FIG. 5 how it is possible to deploy, in accordance with the invention, a duct 1, which passes all the way through the pile 21 of powder-like material while being deployed in the direction of the arrow 24.

FIGS. 6a, 6b and 6c show how the duct 1 can be extracted from the mass of powder-like material after use, by exerting traction on the spiral armature of the duct.

In FIG. 6a, the duct 1 can be seen in the position of use. Armature 4 of the duct is affixed to the piece 6, which plugs the bottom part of the container 2 due to the fact that the bottom portion of the armature is resiliently engaged in the groove 6a of the piece 6.

FIG. 6b shows how traction in the direction of the arrow deforms the armature 4 by reducing the diameter of the duct, and FIG. 6a shows how the armature is disengaged from the groove 6a, while piece 6 remains in place and the duct is extracted from the top.

It is understood that the examples above are given by way of illustration and not by way of limitation. They can be modified in any way desirable without thereby departing from the scope of the invention.

I claim:

1. A method for the deployment of a duct within a mass of powder-like material having interior and exterior portions, comprising the steps of:
    (a) providing a collapsed, compacted duct within a cylindrical cartridge;
    (b) affixing a penetrating/anchoring piece temporarily to a forwardmost end of said duct;
    (c) driving said cartridge from exterior portions of said mass into interior portions of said mass in a first penetrating direction to anchor the forward end of said duct deep within said mass in a fixed position;
    (d) retracting said cartridge toward the exterior of said mass to deploy and to expand said duct and to provide communication from deep within said mass to the exterior of said mass through said deployed, expanded duct.

2. The method of claim 1 further characterized by:
    (a) forcing said cartridge into said mass with a driving probe in a first driven direction to a predetermined point of penetration where said first end of said duct is anchored;
    (b) said first driven direction of said driving probe is reversed to retract said cartridge during the deployment of said duct.

3. The method of claim 1 further characterized in that:
    (a) said mass of powder-like material is grain;
    (b) a treatment fluid is injected into said duct from the exterior of said mass to the interior of said mass.

4. The method of claim 3 further characterized in that:
    (a) said treatment fluid is a gas for fumigating and/or drying said grain.

5. The method of claim 1 further characterized in that:
    (a) a fluid is withdrawn from the interior of said mass under partial vacuum to the exterior of said mass.

* * * * *